United States Patent
Harland et al.

(10) Patent No.: US 7,165,808 B2
(45) Date of Patent: Jan. 23, 2007

(54) REAR SEAT STORAGE CONSOLE

(75) Inventors: Charles E. Harland, Marysville, MI (US); James D. Schubring, Shelby Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/885,819

(22) Filed: Jul. 7, 2004

(65) Prior Publication Data

US 2006/0006703 A1 Jan. 12, 2006

(51) Int. Cl.
*A47C 7/62* (2006.01)
*A47C 1/02* (2006.01)

(52) U.S. Cl. .................. 297/188.01; 297/334; 297/337

(58) Field of Classification Search ................ 297/117, 297/188.01, 188.14, 15, 337, 334; 296/66
See application file for complete search history.

(56) References Cited

U.S. PATENT DOCUMENTS

| | | | | |
|---|---|---|---|---|
| 1,649,608 A | * | 11/1927 | Matthews | ................ 296/65.09 |
| 4,005,902 A | * | 2/1977 | Balin | .......................... 297/129 |
| 4,533,175 A | * | 8/1985 | Brennan | ...................... 297/232 |
| 5,921,610 A | * | 7/1999 | Grimes | ........................ 296/153 |
| 5,947,554 A | * | 9/1999 | Mashkevich | ................. 297/115 |
| 6,027,164 A | * | 2/2000 | Jakubiec et al. | ........ 297/188.01 |
| 6,039,402 A | * | 3/2000 | Nemoto | ................. 297/411.34 |
| 6,042,180 A | * | 3/2000 | Lombardi | .............. 297/188.11 |
| 6,102,463 A | * | 8/2000 | Swanson et al. | .......... 296/37.15 |
| 6,386,629 B1 | * | 5/2002 | Severinski et al. | ....... 297/188.1 |
| 6,601,900 B1 | | 8/2003 | Seibold | |
| 6,688,696 B1 | | 2/2004 | Brush et al. | |
| 6,773,059 B1 | * | 8/2004 | Volotsenko | .................. 297/129 |
| 2001/0054835 A1 | * | 12/2001 | Feng | ........................... 297/232 |

* cited by examiner

*Primary Examiner*—Peter M. Cuomo
*Assistant Examiner*—Sarah B. McPartlin
(74) *Attorney, Agent, or Firm*—Ralph E. Smith

(57) ABSTRACT

A folding seat and storage console assembly for a vehicle is provided. The assembly has a storage console positioned on a seat bottom frame. A pair of front legs is each pivotally connected to the seat bottom frame. A pair of rear legs is pivotally connected to the seat bottom frame, wherein said seat bottom frame is translatable between an unfolded position and a folded position by folding the front legs and the rear legs about their respective pivotal connections.

3 Claims, 2 Drawing Sheets

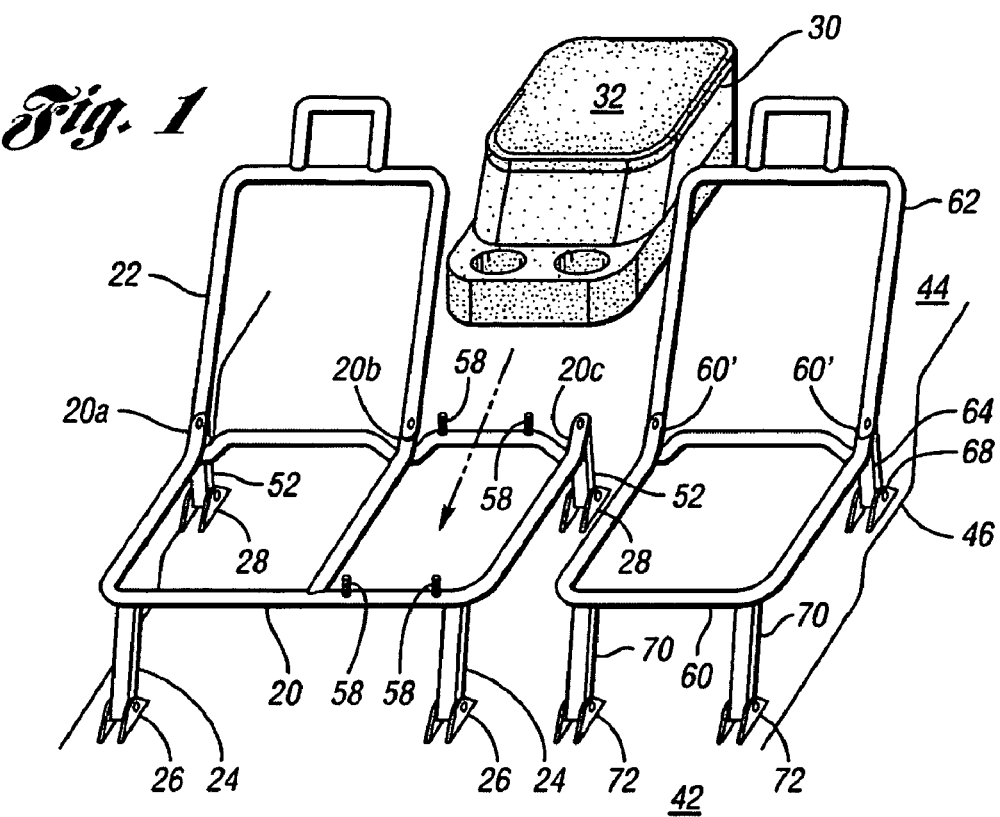

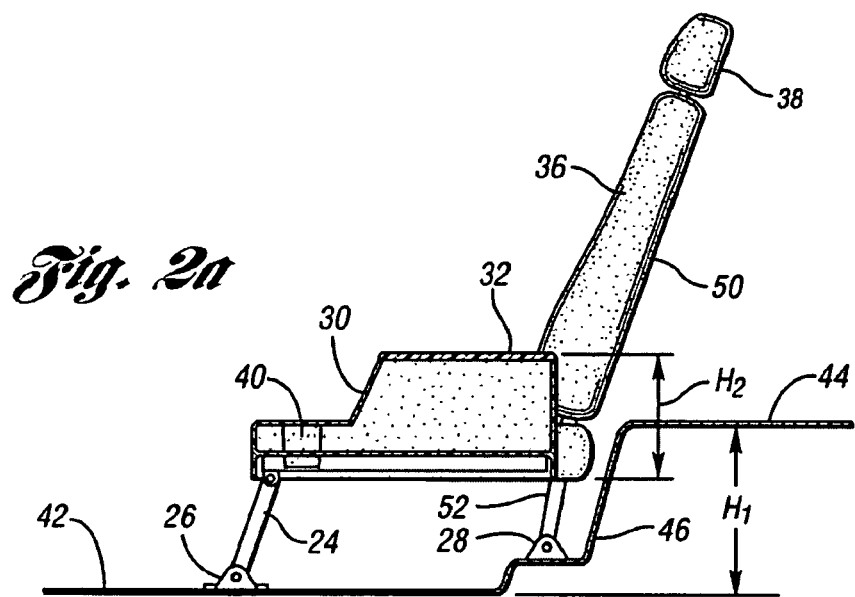
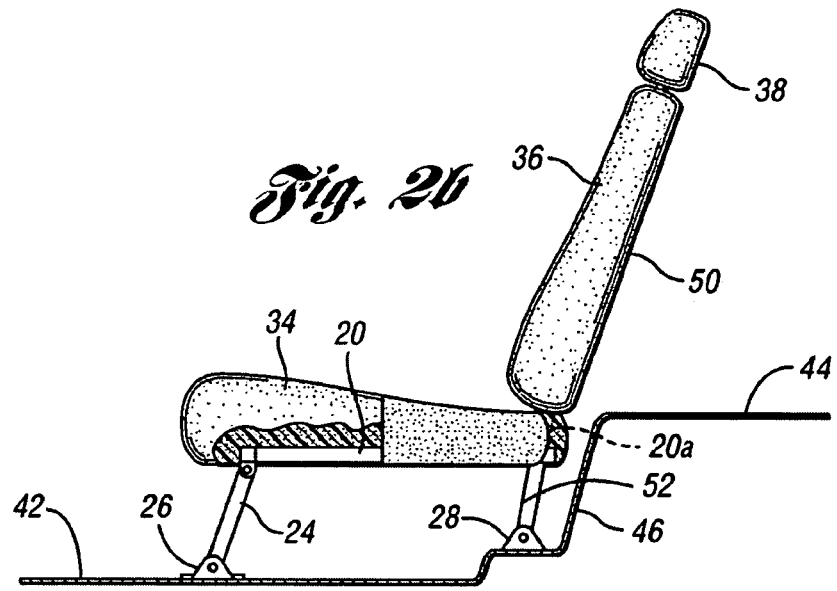
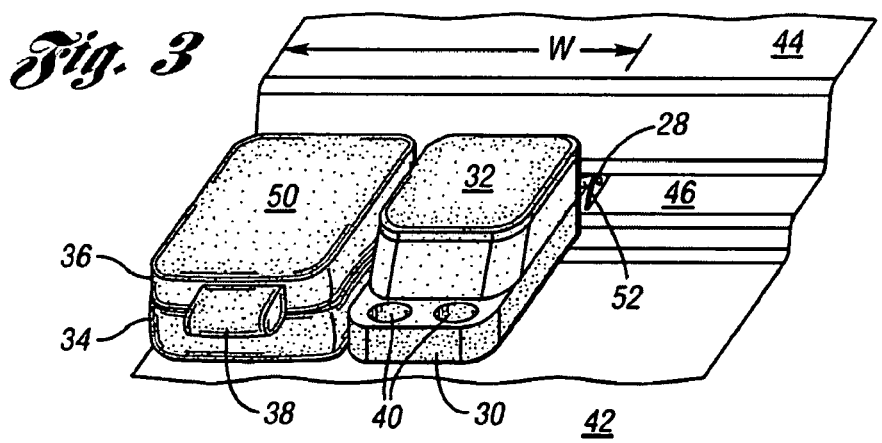

REAR SEAT STORAGE CONSOLE

FIELD OF THE INVENTION

The present invention relates to vehicle seats which fold flat against a vehicle floor, and more particularly to such seats having an integral storage compartment.

BACKGROUND OF THE INVENTION

Motor vehicles typically have a row of front seats and one or more rows of back seats situated parallel to and behind the row of front seats. Each row of seats generally has a storage area associated with it so that seat occupants can store belongings while traveling in the vehicle. For example, the front row of seats is often associated with a center console and a glove box. The back seats generally are associated with pockets in the seat-backs of the row immediately in front of the back seats, or with pockets formed in the vehicle interior trim adjacent to the ends of a back seat row.

In some cases, the storage volume available in the pockets is insufficient to store the belongings of rear seat occupants. In these cases, it would be desirable to provide a storage console in a back seat row. However, traditional storage console designs and attachment methods are only undesirably suitable for incorporation into a vehicle having rear seats that fold down to create a flat load floor in the position of the rear seats. With fold-flat seats, a traditional storage console mounted in a traditional manner creates a trade-off in choosing the height of the storage console. If a flat load floor is desired in the position of the storage console while the seats are folded, then the storage console will be too short to provide a comfortable arm rest while the seats are unfolded. Conversely, if the storage console is tall enough to provide a comfortable arm rest while the seats are unfolded, then storage console will undesirably protrude above the load floor when the seats are folded.

SUMMARY OF THE INVENTION

In accordance with these undesirable aspects identified in the prior art, a folding seat and storage console assembly for a vehicle is provided. The assembly has a storage console positioned on a seat bottom frame. A pair of front legs is each pivotally connected to the seat bottom frame. A pair of rear legs is pivotally connected to the seat bottom frame, wherein said seat bottom frame is translatable between an unfolded position and a folded position by folding the front legs and the rear legs about their respective pivotal connections.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 depicts a partial exploded view of a folding seat frame and storage console.

FIG. 2 depicts an unfolded seat assembly with a storage console.

FIG. 2a depicts a cross-section view taken along section line 2a—2a of FIG. 2.

FIG. 2b depicts a cross-section view taken along section line 2b—2b of FIG. 2.

FIG. 3 depicts a folded seat assembly with a storage console.

DETAILED DESCRIPTION OF THE PREFERRED EMBODIMENTS

The following description of the preferred embodiment(s) is merely exemplary in nature and is in no way intended to limit the invention, its application, or uses.

Turning to FIG. 1, a partial exploded view of a seat frame assembly with a storage console is shown. The assembly is preferably positioned in a vehicle transverse to the vehicle's longitudinal axis and behind a front seating row in the vehicle. A seat bottom frame 20 has upturned portions 20a and 20b pivotally connected to a seat back frame 22. A plurality of fasteners 58 are provided to align and secure a storage console 30 to the seat bottom frame 20. The storage console 30 is attached to an opening lid 32 which is used to gain access to a storage console interior. In a preferred embodiment, the seat bottom frame 20 resembles a figure-8 positioned in a plane parallel to the vehicle floor and transverse to the longitudinal vehicle axis.

The seat bottom frame 20 is pivotally connected to a pair of front legs 24 at their first ends. The front legs 24 are pivotally connected at their second ends to front floor brackets 26. The front floor brackets 26 are made fast to a foot well 42 portion of a vehicle floor.

The seat bottom frame is also pivotally connected at upturned ends 20a and 20c to first ends of a pair of rear legs 52. The second ends of the rear legs 52 are pivotally connected to rear floor brackets 28, which are made fast to a waterfall 46 portion of the vehicle floor.

A second seat assembly may be located adjacent to the seat assembly described immediately above. The second seat assembly has a seat bottom frame 60 having upturned portions 60'. The upturned portions 60' are pivotally connected to a seat back frame 62. Front legs 70 are pivotally attached at first ends to the seat bottom frame 60. The second ends of front legs 70 are pivotally attached to front floor brackets 72, which are made fast to the foot well 42. Pair of rear legs 64 are pivotally attached at their first ends to upturned portions 60' and at their second ends to rear floor brackets 68. The rear floor brackets 68 are made fast to the waterfall 46 portion of the vehicle floor.

Turning now to FIG. 2, the completed seat assemblies are shown in an unfolded position. Seat bottom cushion 34 is secured to seat bottom frame 20 using fastenings known in the art. Similarly, seat back cushion 36 is secured to seat back frame 22 as is known in the art. A headrest 38 is provided at the top of seat back cushion 36 and is preferably adjustable in height.

Turning to FIG. 2a, a cross section view is shown which is taken along section line 2a—2a in FIG. 2. A height H1 indicates the difference in height between the load floor 44 and the foot well 42 of the vehicle floor. A height H2 indicates the height of the storage console 30 together with its lid 32. In a preferred embodiment it is desirable that the seat frame assembly and storage console 30 together with its lid 32, be dimensioned such that H2 is less than or equal to H1, and that that the top surface of lid 32 is coplanar with the load floor 44 when the seat frame assembly is folded as described later herein.

Turning to FIG. 2b, a cross section view is shown taken along section line 2b—2b of FIG. 2. Seat back cushion 36 is attached to a seat back panel 50. In a preferred embodiment, the thicknesses and contours of seat bottom cushion 34 and seat back cushion 36 are chosen such that when seat back frame 22 is folded about the pivotal connections at upturned ends 20a and 20b (shown in FIG. 1), and the seat frame assembly is folded as described later, the seat back panel 50 is coplanar with the load floor 44.

Turning now to FIG. 3, the seat and storage console are shown in a folded position. Rear legs 52 are folded forward about the pivotal connection to rear floor brackets 28. Front legs 24 are hidden from view; however they are folded forward about the pivotal connection to front floor brackets 26. The seat frame 20 therefore is positioned in closer proximity to the floor than when the seat assembly is in the unfolded position as shown in FIG. 1.

The seat back frame 22 folds forward about the pivotal connections to the upturned portions 20a and 20b, allowing the seat cushion back 36 to rest against seat bottom cushion 34. A seat back panel 50 is positioned on the back of the seat back frame 22 and substantially parallel to the seat back cushion 36 is now coplanar with the load floor 44. In a preferred embodiment, the seat back panel 50 is finished with same material as the surface of the load floor 44.

With the seat frame assembly in the folded position the storage console 30 is positioned below the plane of load floor 44. The top surface of lid 32 is coplanar with the load floor 44. In a preferred embodiment the surface of the lid 32 is finished with the same material as the surface of the load floor 44.

The view of the second seat assembly has been omitted to provide a clear view of the folded seat and storage console assembly, however the second seat assembly may be similarly folded.

In a preferred embodiment, the width of the storage console is between 15% and 45% of the combined width W of the seat/storage console assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a motor vehicle having a row of front seats positioned transverse to the longitudinal axis of the vehicle and having a floor with a load floor portion, a folding rear seat assembly comprising:

a seat bottom frame;

a storage console having a top cover, said storage console being positioned on said seat bottom frame;

a pair of front legs, each pivotally connected at their first ends to said seat bottom frame and pivotally connected at their second ends to the vehicle floor; and a pair of rear legs, each pivotally connected at their first ends to said seat bottom frame and pivotally connected at their second ends to the vehicle floor, wherein said seat bottom frame is translatable between an unfolded position and a folded position by folding said front legs and said rear legs about their respective pivotal connections, said folded position being characterized by positioning said top cover coplanar with the vehicle load floor portion.

2. The assembly of claim 1 further comprising a seat back frame pivotally connected to said seat bottom frame.

3. The assembly of claim 2 further comprising:

a seat bottom cushion positioned on said seat bottom frame;

a seat back cushioned positioned on said seat back frame, said seat back cushion having a seating surface; and a seat back panel positioned on said seat back frame, said seat back panel being coplanar with said top cover when said seat back frame is folded forward about its pivotal connections such that said seat back cushion is substantially parallel with said seat bottom cushion.

* * * * *